United States Patent [19]

Hoffman

[11] Patent Number: 5,471,773

[45] Date of Patent: * Dec. 5, 1995

[54] ILLUMINATED SIGN

[76] Inventor: Peter Hoffman, 452 S. Congress Ave., W. Palm Beach, Fla. 33406

[ * ] Notice: The portion of the term of this patent subsequent to Nov. 29, 2011, has been disclaimed.

[21] Appl. No.: 318,953

[22] Filed: Oct. 6, 1994

Related U.S. Application Data

[60] Continuation of Ser. No. 996,425, Dec. 23, 1992, Pat. No. 5,367,806, which is a division of Ser. No. 868,931, Apr. 16, 1992, Pat. No. 5,339,550.

[51] Int. Cl.⁶ .................................................. G09F 13/22
[52] U.S. Cl. ............................... 40/544; 40/591; 40/594; 248/467
[58] Field of Search .......................... 40/544, 580, 591, 40/593, 594; 248/205.3, 467; 362/84

[56] References Cited

U.S. PATENT DOCUMENTS

| | | |
|---|---|---|
| 2,908,806 | 10/1959 | Cohen . |
| 2,922,912 | 1/1960 | Miller . |
| 3,012,164 | 12/1961 | Franzone et al. . |
| 3,037,137 | 5/1962 | Motson . |
| 3,069,509 | 12/1962 | Sherron . |
| 3,137,083 | 6/1964 | George et al. . |
| 3,226,272 | 12/1965 | Longfellow . |
| 3,316,435 | 4/1967 | Kelso . |
| 3,317,722 | 5/1967 | Whitney . |
| 3,404,474 | 10/1968 | Johnson . |
| 3,680,237 | 8/1972 | Finnerty, Sr. . |
| 4,020,389 | 4/1977 | Dickson et al. . |
| 4,066,925 | 1/1978 | Dickson . |
| 4,138,620 | 2/1979 | Dickson . |
| 4,443,832 | 4/1984 | Kanamori et al. . |
| 4,466,208 | 8/1984 | Logan, Jr. et al. ................. 40/544 |
| 4,494,326 | 1/1985 | Kanamori . |
| 4,704,941 | 11/1987 | Reilly . |
| 4,955,153 | 9/1990 | Albrecht et al. ................. 40/593 X |
| 4,999,936 | 3/1991 | Calamia et al. . |
| 5,005,306 | 4/1991 | Kinstler . |
| 5,339,550 | 8/1994 | Hoffman ................. 40/544 |
| 5,367,806 | 11/1994 | Hoffman ................. 40/544 |

FOREIGN PATENT DOCUMENTS

| | | | |
|---|---|---|---|
| 2468173 | 5/1981 | France | ................. 248/467 |
| 2230638 | 10/1990 | United Kingdom . | |

Primary Examiner—Brian K. Green

[57] ABSTRACT

An improved illuminated sign for adhesive bonding to the inner surface of a pane of transparent material such as the glass of an automotive window comprises a backing panel, a planar electroluminescent lamp, and an indicia-bearing member. The indicia-bearing member is smaller in planar extent than an assembly of the backing panel and the lamp. Strips of double-sided adhesive tape are applied to the border of the backing panel. The second adhesive surface of the tape is used to bond the assembly of the backing panel, the lamp and the indicia-bearing member to the inner surface of an automobile window or the like.

1 Claim, 3 Drawing Sheets

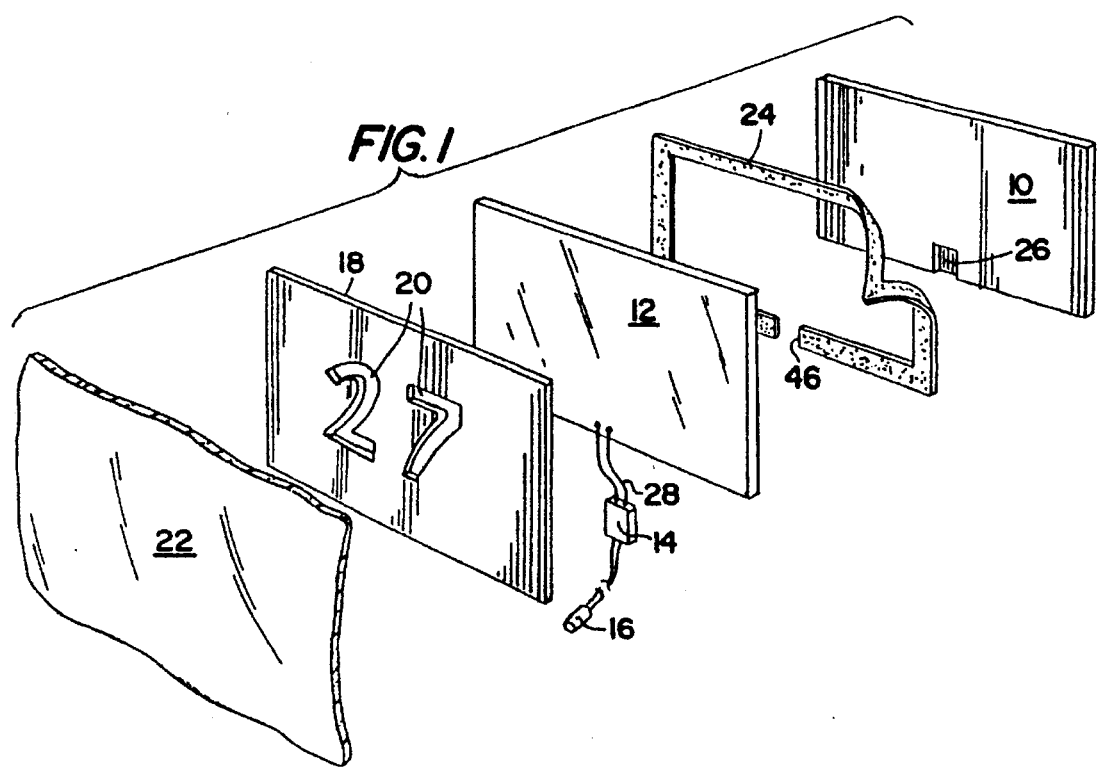
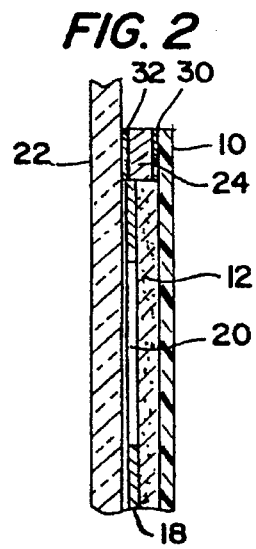 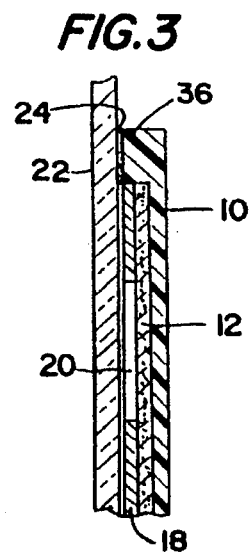 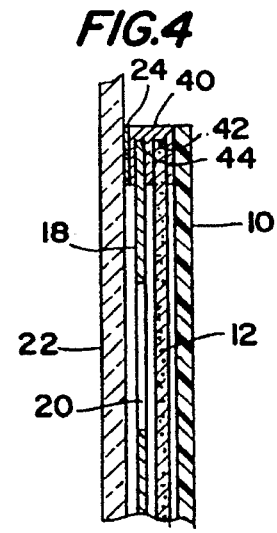
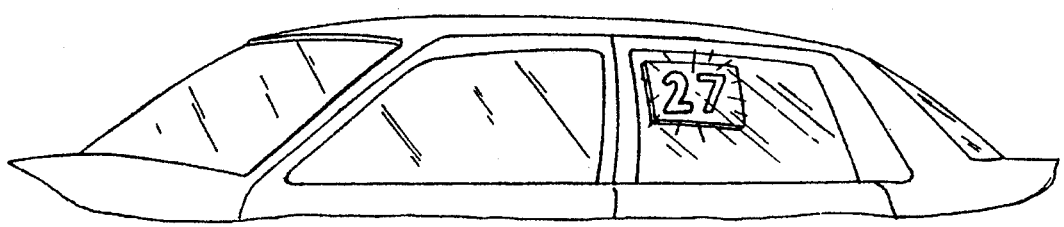

ILLUMINATED SIGN

This application is a continuation of pending application Ser. No. 07/996,425, filed Dec. 23, 1992, which is a division of application Ser. No. 07/868,931, filed Apr. 16, 1992, and now U.S. Pat. No. 5,339,550.

BACKGROUND OF THE INVENTION

1. Field of the Invention

The present invention relates to a low cost, readily manufacturable, easily assembled, illuminated sign for convenient adhesive mounting on panes of transparent material, such as the inside surfaces of automobile windows.

2. Discussion of the Prior Art

Illuminated signs employing flat panel electroluminescent lamps typically include a flat layer of phosphor material and two electrodes such that when coupled with an appropriate alternating-current power supply the lamp provides a flat, lighted panel of low cost and high efficiency. A neat and attractive lighted sign using such an electroluminescent lamp can be made by covering the luminous surface of the lamp with an indicia-bearing member, such as a sheet of opaque plastic material cut-out to define indicia through which the lighted panel is visible. The cut-out indicia can be colored by placing translucent colored plastic sheet material or the like over the cut-out indicia.

U.S. Pat. Nos. 5,005,306 to Kinstler, No. 4,138,620 to Dickson and No. 3,680,237 to Finnerty are representative of prior art signs formed of electroluminescent panels and overlying indicia-bearing members for external application to motor vehicles and for use as illuminated house numbers. Such prior art signs are relatively expensive to manufacture and assemble, include an excessive number of components, and are not easily mounted on support surfaces.

SUMMARY OF THE INVENTION

Accordingly, it is an object of the present invention to overcome the above mentioned disadvantages of the prior art by providing a low cost illuminated sign for convenient and easy application to a surface.

It is a further object of the present invention to provide a method of assembly of an illuminated sign to a surface in a simple end quick manner involving no complicated assembly techniques or costly materials.

The present invention includes a flat backing panel, a planar electroluminescent lamp, a suitable power supply for the lamp, an indicia-bearing member typically including at least one opaque portion and having one or more translucent or transparent portions cut-out therefrom defining the indicia, and a number of strips of double-sided adhesive tape, that is, tape having adhesive on two opposed faces thereof. In one embodiment, the backing panel is slightly larger in planar extent than the lamp and the indicia-bearing member. To assemble the sign, the lamp and the indicia-bearing member are placed over the backing panel, leaving a peripheral border of the backing panel exposed. Strips of the double-sided tape are adhesively bonded to the peripheral border of the backing panel, leaving a gap for wires connecting the lamp and power supply. The adhesive on the second face of the double-sided tape is then used to bond the assembly of the backing panel, the lamp and the indicia-bearing member to the inside surface of a pane of transparent material, such as an automobile window. In an alternative embodiment, the lamp and backing panel are of the same general size, the lamp is laminated to the backing panel, and the strips of double-sided tape are applied to the lamp. In a further embodiment, the indicia-bearing member is adhesively mounted to the pane of transparent material, and the lamp assembled thereto.

According to the invention, the entire assembly is maintained inside the automobile, protecting it from weather, theft or other damage, and maintaining its neat and attractive appearance. As the sign is mounted on the inside surface of the automobile window, it is relatively close to the eye level of other motorists, improving its advertising function. Mounting the sign on the glass window using simple double-sided adhesive tape renders it very inexpensive to manufacture and to use and re-use.

Other objects and advantages of the present invention will become apparent from the following description of the preferred embodiment taken in conjunction with the accompanying drawings wherein like parts in each of the several figures are identified by the same reference characters.

BRIEF DESCRIPTION OF THE DRAWINGS

FIG. 1 is an exploded perspective view of an advertising sign according to their invention.

FIG. 2 is a broken cross-sectional view of a first embodiment of the sign of the invention.

FIG. 3 is a view comparable to FIG. 2 illustrating a second embodiment of the sign of the invention.

FIG. 4 is a view comparable to FIG. 2 illustrating a third embodiment of the sign of the invention.

FIG. 5 is a partial perspective view of an automobile having the sign of the invention mounted thereon.

DESCRIPTION OF THE PREFERRED EMBODIMENTS

Figure 6:
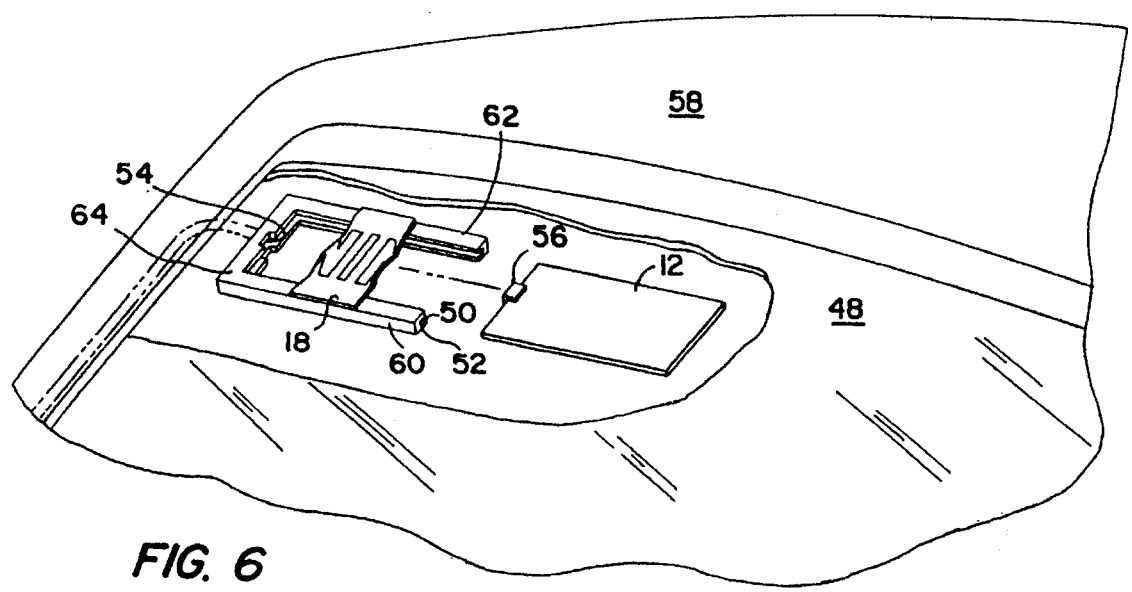
FIG. 6 illustrates another embodiment of the invention mounted on an automobile windshield.

As shown in FIG. 1, the sign according to the invention includes a backing panel 10, essentially a flat plastic member, and a similarly planar electroluminescent lamp 12, such as the Durel 3 lamp, commercially available from Durel Corporation, Tempe, Ariz. This and similar lamps essentially are formed of a layer of phosphor material and suitable electrodes. The lamp 12 may be integral with or laminated on the backing panel 10. Readily available "ABS" plastic is suitable for the material of panel 10. Power is supplied to the lamp 12 via wires 28 connected to a power supply 14 which is connected with an adapter 16 for connecting the power supply to a suitable source of electricity such as the electrical system of an automobile. Conveniently, the adapter 16 may fit the cigarette lighter socket provided by most automobiles. The power supply 14 converts direct current to alternating current required by the conventional electroluminescent lamp 12. An indicia-bearing member 18 fits over the lamp 12 and is formed to define suitable indicia indicated generally at 20. The indicia-bearing member 18 can be formed of an opaque black vinyl or acetate plastic film, e.g. 0.003 inches in thickness, having the indicia 20 simply cut out and removed therefrom. Alternatively or additionally, the indicia-bearing member 18 can be formed of one or more translucent, colored, or fluorescent vinyl or other plastic films so that the indicia 20 appear in various colors as seen by observers.

The assembly of the panel 10, the lamp 12 and the indicia-bearing member 18 is secured to the inner surface of a pane of transparent material 22, such as the glass of an automobile window, by strips of double-sided adhesive tape 24. The backing panel is somewhat larger in peripheral outline than the lamp 12 and the indicia-bearing member 18 so that when the lamp 12 and indicia-bearing member 18 are assembled over the backing panel 10, a peripheral border portion of the panel 10 is left exposed. The double-sided tape 24 is adhesively bonded to the exposed border portion of the backing panel 10 by the adhesive on a first face of the tape. The adhesive on the second face of the tape 24 is then used to adhere the assembly to the inner surface of a pane 22 of transparent material, such as a glass window of an automobile, as shown in FIG. 5.

Alternatively, the backing panel 10 and lamp 12 may be of the same size and shape, the lamp laminated to the panel, and the tape applied to the periphery of the lamp.

As indicated in FIG. 1, the panel 10 includes a recess 26 through which the wires 28 connecting the lamp 12 to the power supply 14 pass. A gap 46 is similarly left in the corresponding strip of tape 24 to allow passage of the wires 28.

FIG. 2 is a cross-sectional view of the border of a first embodiment of the sign of the invention assembled to a pane of transparent material while FIGS. 3 and 4 show similar views of the assembly according to second and third embodiments of the sign of the invention. In each embodiment, the sign of the invention includes a backing panel 10, a strip of double-sided tape 24, a planar electroluminescent lamp 12 and an indicia-bearing member 18 having indicia indicated at 20 formed therein by removing portions of the otherwise opaque indicia-bearing member 18. Layers of adhesive 30 and 32 on opposed faces of the tape 24 bond the tape 24 to the backing panel 10 and to the pane 22 of transparent material.

In the embodiment of FIG. 2, the overall thickness of the tape 24 is at least equal to the combined thickness of the lamp 12 and the indicia-bearing member 18. This is readily achieved by using commercially available foam tape formed of a relatively thick substrate of flexible foamed plastic material or the like having a layer of a suitable adhesive on both opposed faces. Double-sided foam tape ¼ inch wide by ⅛ inch thick is suitable and is readily available.

FIG. 3 shows an embodiment of the invention in which relatively thin double-sided adhesive tape 24 is used. In this embodiment, the backing panel 10 has a raised border portion 36 so that the thickness of the border portion 36 and the tape 24 is at least equal to the combined thickness of the lamp 12 and the indicia-bearing member 18. The raised border portion 36 can be integrally molded with the backing panel 10 or can be assembled thereto.

Figure 7:
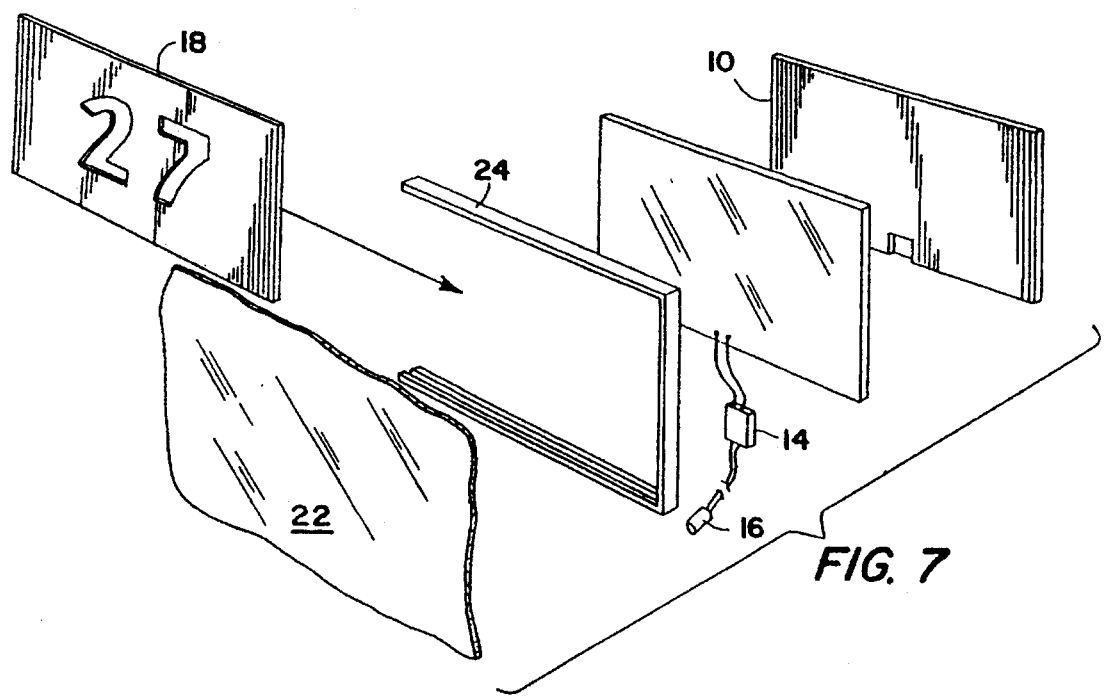
FIG. 7 is a view comparable to FIG. 1 illustrating a further embodiment of the invention.

In the embodiment of FIG. 4, three sides of the border around a generally rectangular backing panel 10 are formed of a member 40 of "E"-shaped cross-section defining channels 42 and 44 receiving the lamp 12 and the indicia-bearing member 18, respectively. The member 40 can conveniently be extruded of an inexpensive plastic material and bonded to the backing panel 10. The member 40 is then assembled to the inner surface of a transparent pane 22 by strips of the double-sided tape 24. The remaining side of the assembly can be closed by a member (not shown) removably secured to the backing panel 10 to allow the indicia-bearing member to be changed. Alternatively, the fourth side of the assembly can be left open to facilitate removal and replacement of the indicia-bearing member, as shown in FIG. 7.

In the embodiment of FIG. 2, the strips of tape 24 are applied to the periphery of the backing panel 10 so as to define a gap 46 to allow the wires 28 to pass through the border of the sign As shown in FIG. 1, the backing panel 10 has a recess 26 formed therein in alignment with gap 46 to allow the wires 28 to pass. In the embodiment of FIG. 3, the raised portion 36 extending around the border of the backing panel 10 also has a gap, formed therein for the wires 28 to pass, and the tape 24 need not be applied over the gap. In the embodiment of FIG. 4, one of the E-shaped members 40 or the member (not shown) on the remaining side of the assembly must have a gap formed therein for the wires to pass. Again, the tape 24 need not be applied over the gap.

As indicated, in use of the sign of the invention, the lamp 12 and a desired indicia-bearing member 18 are assembled over the backing panel 10 so that a border remains around the periphery of the backing panel 10. Alternatively, the lamp 12 is laminated to the backing panel. A layer of double-sided tape 24 is then applied substantially around the peripheral border of the panel (or to the assembly of the lamp and backing panel) so that a first adhesive surface of the tape 24 is bonded to the backing panel 10. The second adhesive surface of the tape 24 is then used to secure the assembly of the backing panel 10, the lamp 12, and the indicia-bearing member 18 to the inner surface of a pane 22 of transparent material such as an automobile window, as shown in FIG. 5. The sign may then be energized by connecting power supply 14 to a suitable power source such as by plugging the adapter 16 into a cigarette lighter socket of the automobile. In this way a simple and readily reusable sign assembly is provided. The cost of the double-sided tape 24 is minimal so that the sign can be removed and the indicia-bearing member 18 replaced with one bearing a new message as often as desired, and at minimal cost.

FIG. 6 shows another embodiment of the sign of the invention. In this example, a relatively small sign may be placed in one corner of the windshield 48 of an automobile, e.g. bearing a legend indicating that the automobile is fitted with an alarm system. The indicia-bearing member 18 may be permanently bonded to the windshield 48. The lamp 12, and backing panel 10 if provided, may be removably fixed to the windshield 48 by sliding into opposed channels 50 in a three-sided receptacle 52 permanently bonded to the inner surface of the windshield 48. Receptacle 52 may comprise opposed parallel members 60 and 62 generally C-shaped in cross-section, as indicated, and a third end member 64, of generally similar cross sectional configuration. Members 60, 62 and 64 can be molded integrally. Receptacle 52 and lamp 12 comprise mating electrical connectors 54 and 56 respectively. Connector 54 on receptacle 52 is connected to the automobile electrical system by wires 28 extending along a pillar 58 of the automobile's roof structure.

In a further alternative embodiment of the invention shown in FIG. 7, the double-sided tape 24 may be applied to three sides of the assembly of the lamp 12 and backing panel 10, leaving a fourth edge of the assembly free. The assembly can then be applied to the interior surface of an automobile window 22 or the like, permitting a sheet-like indicia-bearing member 18 to be removed and replaced as desired without removing the lamp and backing panel from the window. The indicia-bearing member 18 may be made wider than the backing panel 10 and lamp 12, so that an edge of the indicia-bearing member 18 protrudes from the assembly of the backing panel 10 and lamp 12, allowing convenient removal and replacement of the indicia-bearing member 18.

According to the invention, the luminescent sign is applied to the inside surface of a pane of transparent material. The sign is thereby protected from weather and vandalism, and will not tend to blow off the automobile due to wind. Thus the sign of the invention need not be weatherproofed, will remain neat and legible, and will be more reliable and durable in use than prior art signs employing electroluminescent panels intended to be mounted on the outside of a motor vehicle.

Figure 8:
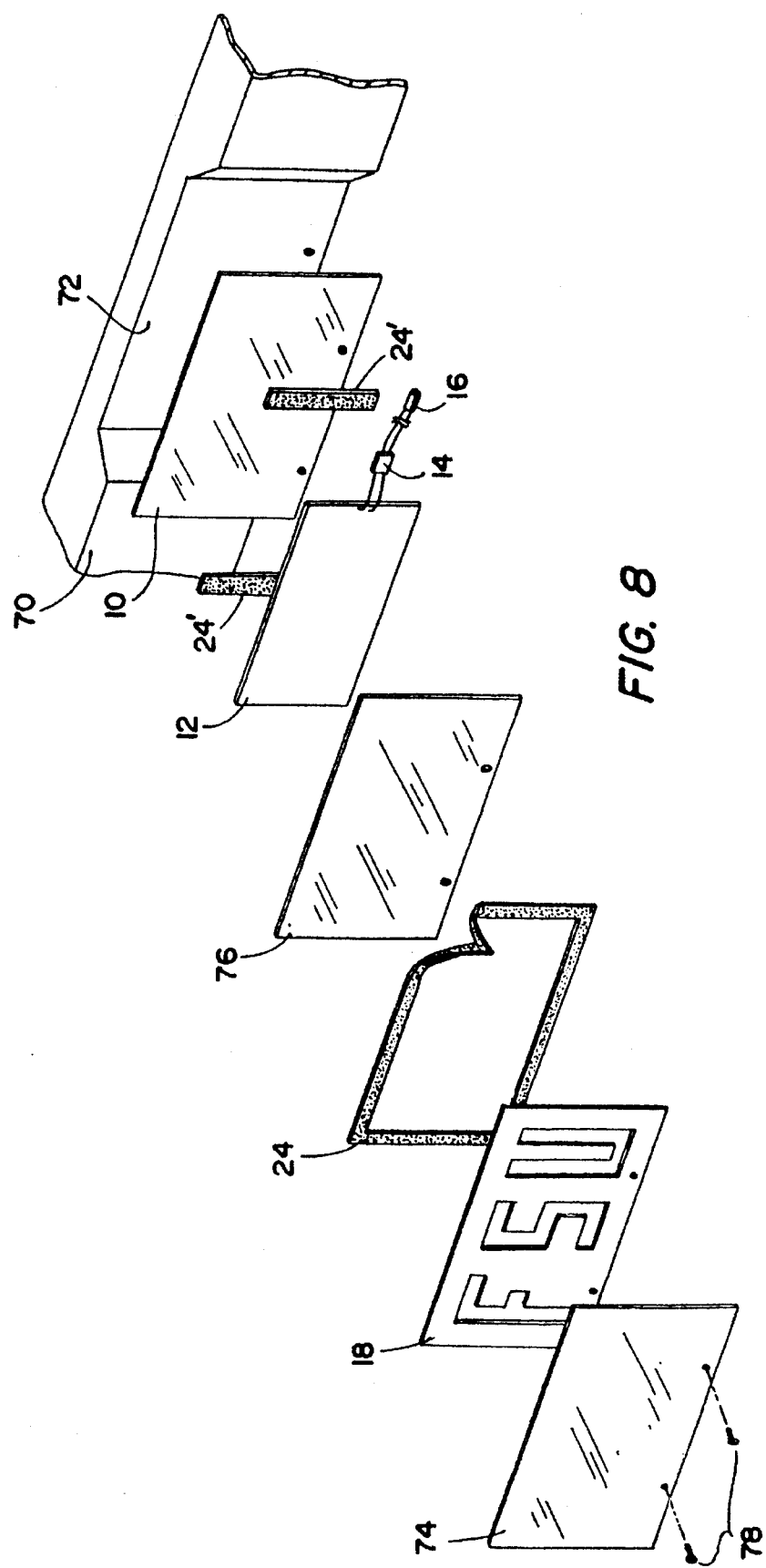
FIG. 8 shows a further embodiment of the invention.

FIG. 8 shows a further embodiment of the illuminated sign of the invention. In this case the sign of the invention is adapted specifically to be mounted to the license plate bracket 72 of a motor vehicle 70, at which a license plate is conventionally mounted. In this embodiment the illuminated sign of the invention again comprises an electroluminescent lamp 12 provided with a suitable power supply 14 and connector 16. The lamp 12 may be mounted to a backing plate 10. The lamp 12 may be laminated conveniently between the backing panel 10 and a transparent panel 76. Indicia-bearing member 18 is placed over the lamp 12, and is retained to the assembly of the lamp and backing panel 10 by a further transparent cover panel 74. Screws 78 or the equivalent may be used to secure the assembly to the license plate bracket 72 of the motor vehicle 70. In this embodiment, the backing panel 10, transparent panel 76, and cover panel 74 are each substantially identical in size and shape to conventional license plates, that is, 12 inches wide by 6 inches high. The indicia-bearing member is of similar size. The indicia may be somewhat smaller, so that a smaller lamp 12 may be economically employed. As indicated above, strips of double-sided adhesive tape 24 may be useful in assembling the indicia-bearing member 18, cover panel 74, lamp 12, backing panel 10, and transparent overlay panel 76, if used. Other methods of assembly of the sign are considered to be generally within the skill of the art.

The backing panel 10, the lamp 12 and the indicia-bearing member 18, as well as any border members used, can each be flexible, in order to allow the sign of the invention to conform to a curved window surface. For durability and simplicity in use, the lamp 12 can be permanently affixed to the backing panel 10 by adhesively laminating the non-luminous surface of the lamp 12 to the backing panel 10. As noted above, the lamp can be integral with the backing panel 10. The wires 28 can be permanently bonded to the recess 26 in the backing panel by epoxy or the like. In order to simplify assembly, the indicia-bearing member can also be adhesively bonded to the lamp 12, preferably by a non-permanent adhesive to allow replacement of the indicia-bearing member.

While the discussion of the invention has emphasized its use in connection with motor vehicles, specifically automobiles, signs according to the invention could also be mounted on trucks, boats, and the like, or on articles of clothing or the like, where not otherwise limited.

Therefore, while several preferred embodiments of the invention have been shown and described in detail, it is to be understood that further modifications and improvements can be made thereon and that these are intended to be within the scope of the appended claims.

What is claimed is:

1. An illuminated sign for being mounted to one surface of a generally planar pane of transparent material so that indicia on said sign are visible through the pane of transparent material, said sign comprising:

a planar backing panel having a periphery;

a planar electroluminescent lamp assembled over said backing panel and having a thickness, said backing panel and said lamp together forming an assembly;

a planar indicia-bearing member disposed over said lamp and having a periphery and a thickness, said indicia-bearing member being at least partially translucent to define indicia, said periphery of said indicia-bearing member being of a size to be disposed at least partially within said periphery of said backing panel whereby a border portion of said assembly is exposed at least partially around said periphery of said indicia-bearing member;

a power supply for supplying power to said lamp; and a number of strips of two-faced adhesive tape having adhesive on opposite faces thereof extending along at least part of said border portion, one face of each strip of said tape being bonded by said adhesive to said border portion, whereby said assembly may be affixed to one side of the pane of transparent material by adhesively bonding a second face of each strip of said tape to the pane of transparent material, such that said indicia-bearing member is confined by said strips of tape between said backing panel and the pane of transparent material, said tape having a thickness at least as great as said thickness of said lamp and said thickness of said indicia-bearing member combined, such that said lamp and said indicia-bearing member are received within an upstanding border formed by said strips of tape.

* * * * *